United States Patent [19]

Eisdorfer et al.

[11] Patent Number: 5,745,550
[45] Date of Patent: Apr. 28, 1998

[54] MULTIPLY ACCOMMODATED MESSAGE RELAYING FOR HEARING IMPAIRED CALLERS

[75] Inventors: Jerry Eisdorfer, Somerset; Leonard R. Kasday, Moorestown, both of N.J.; David E. Schulz, Wheaton, Ill.

[73] Assignee: AT&T, Middletown, N.J.

[21] Appl. No.: 476,811

[22] Filed: Jun. 7, 1995

Related U.S. Application Data

[63] Continuation-in-part of Ser. No. 299,937, Sep. 1, 1994, Pat. No. 5,475,733, which is a continuation-in-part of Ser. No. 147,391, Nov. 4, 1993, Pat. No. 5,463,665.

[51] Int. Cl.$^6$ .................................................. H04M 11/00
[52] U.S. Cl. ....................... 379/52; 379/266; 340/825.19
[58] Field of Search ..................... 379/52, 96–99, 379/93, 201, 210, 211, 212, 214, 265, 266, 218, 309, 89, 155, 143; 340/825.19

[56] References Cited

U.S. PATENT DOCUMENTS

5,475,733  12/1995  Eisdorfer et al. ............................ 379/52

*Primary Examiner*—Wing F. Chan
*Attorney, Agent, or Firm*—Henry T. Brendzel

[57] ABSTRACT

A call between a caller using a telephone device for the deaf (TDD), and requiring one or more types of expertise from a calling assistant, and another person, including a TDD user, is connected by automatically prompting the TDD caller for calling information, automatically identifying the expertise needed, including the language being used, selecting a communication assistant (CA) capable of speaking in the language and other expertise, routing the call to the selected CA, and connecting the call.

6 Claims, 11 Drawing Sheets

MULTIPLY ACCOMMODATED MESSAGE RELAYING FOR HEARING IMPAIRED CALLERS

REFERENCE TO CO-PENDING APPLICATIONS

This is a Continuation-in-Part of application Ser. No. 08/299,937 filed Sep. 1, 1994, U.S. Pat. No 5,475,733, which in turn is a Continuation-in-part of co-pending application Ser. No. 08/147,391, filed Nov. 4, 1993 now U.S. Pat. No. 5,463,665 and assigned to the same assignee as this application. The contents of these applications are hereby made a part of this application as if fully recited herein.

FIELD OF THE INVENTION

This invention relates to methods and means for relaying calls between hearing impaired telephone callers using TDD (Telecommunications Device for the Deaf) or ASCII (a computer protocol) technology and other users including voice users, and particularly to calls accommodating such calls to different languages and other characteristics specific to a particular caller that a caller may use.

BACKGROUND OF THE INVENTION

In present systems, a communications assistant (CA) at a relay station provides telecommunication relay service (TRS) by translating signals from a hearing-impaired caller using a TDD or ASCII and another party using voice.

With current technology, a hearing impaired person initiates a TDD call with a keyboard having an alphanumeric display or a printer and the call arrives at a relay center. A PBX (post branch exchange) routes the call to a CA, i.e. a communications assistant or a communications attendant or operator, who now responds. A modem at the CA position auto-answers and attempts to synchronize with the caller. After synchronization, the modem plays a prompt such as "TRS HERE CA 1234 GA". The latter identifies the communication assistant's number such as 1234 and gives a signal such as GA meaning "go ahead". The caller now supplies the forward number, i.e. the number to call, plus special billing information, if any. A typical caller response would be "PLEASE CALL 708 555-1212 GA".

After the caller types "GA" the CA types the forward number and billing information into a billing record and then manually dials the call. This occurs on every ASCII or TDD originated call. The total accumulated time wasted in connected calls is substantial.

It is only after the communications assistant receives the GA signal that communication assistant performs the useful work of translating between TDD signals and voice signals.

The co-pending application Ser. No. 147,391, filed Nov. 4, 1993, improves this situation by automatically prompting a TDD caller for calling information, grammatically parsing received calling information to determine a forward number to one of a number of calling assistants for automatic dialing by the assistant.

The aforementioned co-pending U.S. application Ser. No. 08/299,937 filed Sep. 1, 1994, further improves handling of such calls, and the efficient use of CAs by overcoming the delays which arise when a significant number of callers employ other languages such as Spanish. In that application CAs that speak the other language or are multilingual, and thus are a special resource used efficiently by automatically prompting a TDD or ASCII caller for calling information, automatically analyzing the received calling information in a language-identifying parsing routine, selecting a communication assistant capable of using the identified language; and routing the call to the selected communication assistant.

An object of the invention is to improve methods and means for handling such calls still further.

Another object of the invention is to avoid the aforementioned problems.

SUMMARY OF THE INVENTION

According to an aspect of the invention, these objects are attained by identifying operators more skilled in one operation, such as TDD use, then another such as ASCII transcription, and automatically responding to the incoming signals to direct calls of one class to an operator most skilled in that class, if available and calls of another class to another operator more skilled in the other class.

This adds another dimension to the CA selection process and the more efficient utilization of the scarcer resource.

These and other aspects of the invention are pointed out in the claims. Other objects and advantages of the invention will become evident from the following detailed description when read in light of the accompanying drawings.

DETAILED DESCRIPTION OF PREFERRED EMBODIMENTS

Figure 1:
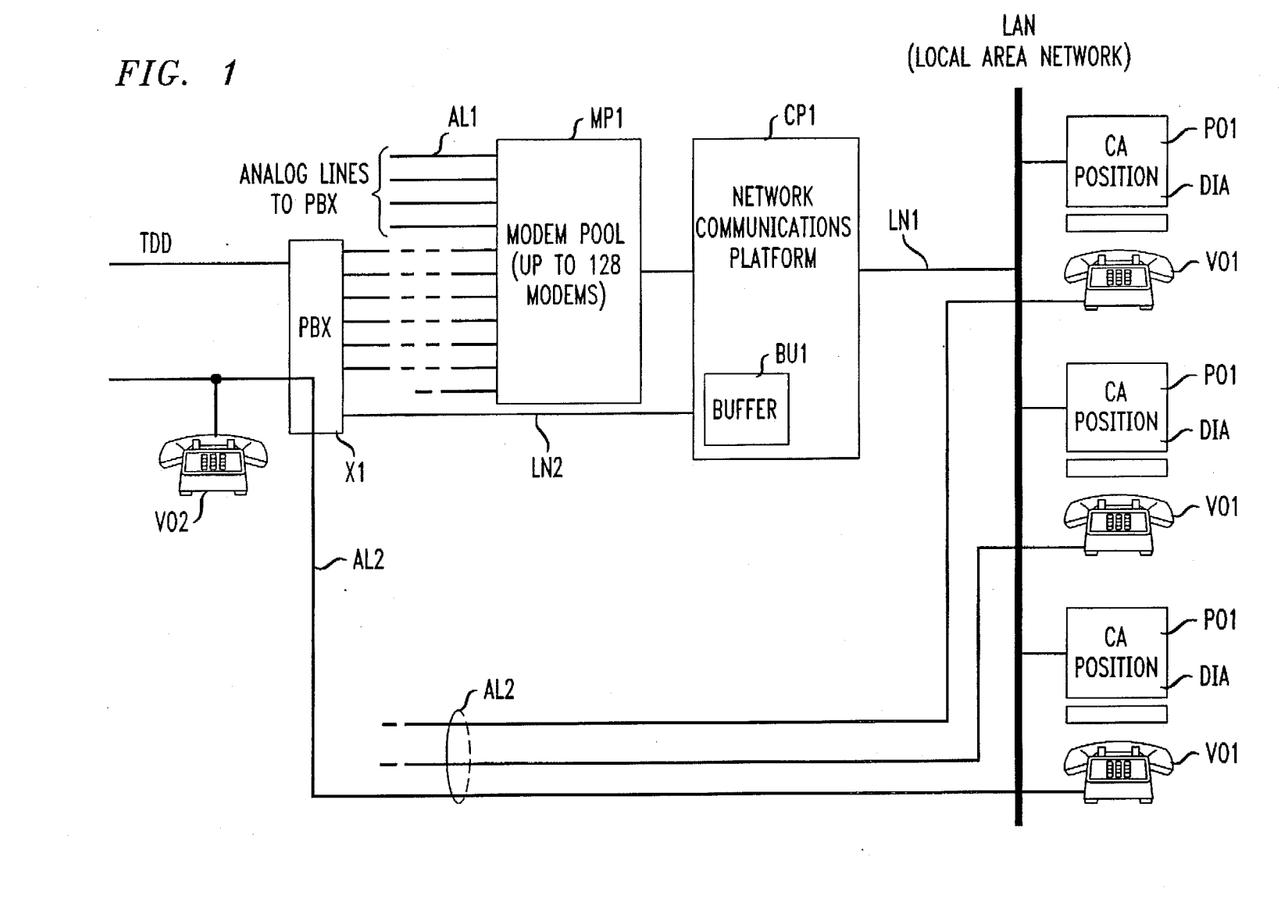
FIG. 1 is a block diagram of the architecture of a relay station embodying features of the invention.

FIG. 1 illustrates the architecture of a telecommunications relay system embodying features of the invention. Here, a PBX X1 receives calls and passes them along a number of analog lines AL1 to a modem pool MP1 which may, for example, have 128 modems. A network communication platform CP1 in the form of a set of processors receives data from and sends data to the modem pool MP1. After processing the data, the network communications platform CP1 passes data to the lines LN1 of a local area network to a number of CA positions PO1 in the form of processors with displays DI1 and voice sets VO1. The platform CP1 also receives data from the PBX X1 through a line LN2.

The network communications platform CP1 routes the calls between the analog lines AL1, the modems of the modem pool MP1, the line LN1, and the CA positions PO1, as well as back from the positions PO1 to the modem pool and the analog lines. The line LN2 controls the PBX and causes it to route calls. The PBX X1 also connects the voice sets VO1 at the CA positions PO1 directly with outside callers' voice sets VO2 for voice communication with voice callers. In the network communications platform CP1 a buffer BU1 buffers calls and a customer data base DB1 holds data such as the nature of the hearing problem at that telephone number. A CA expertise data base DB2 holds data concerning the expertise of various CAs, and a weighting factor data base DB3 holds data to weight the factors in the data bases DB1 and DB2 for a various condition.

In FIG. 1, a TDD or ASCII call arrives at the PBX X1. The network communications platform CP1 routes the call to the modem pool MP1. The network communications platform CP1 then automatically answers the line and plays a prompt such as "TRS here GA". This means that the telecommunications relay service is answering "please go ahead". In contrast to existing technology, the network communications platform CP1 does not display a CA identification because it is not yet known which CA will receive the call. Moreover, the automatic prompt does not specifically request particular information. Callers already know after the greeting that they should indicate whom they wish to call. This avoids intimidation of the caller with questions and interactive computer transactions which may lead to error and frustration. The system allows the callers to provide the information about what they want in their own way. However, this freedom on the part of the caller results in the information which may not follow any specific pattern.

In response, the caller types back billing and forward number information such as "PLS CALL 708 555 1212 GA". Each character enters the input buffer BU1 in the network communications platform CP1. The processor of the communications platform CP1 invokes a parser program or subroutine which parses the present content of the input buffer BU1 after every character that is typed. The parser program looks for a "grammatical" input terminated by "GA". When it finds one it signals the platform CP1.

The platform CP1 then uses the data bases DB1, DB2, and DB3 for cues to determine the various expertises the caller may require of the CA and attempts to choose the CA having all the required qualifications, but as few excess expertises as possible. One of the expertises that is chosen is that of language. For example, a Spanish speaking customer may require a Spanish speaking or multi-lingual CA. On the other hand, the platform CP1 attempts to avoid assigning a comparatively rare multi-lingual CA to a more usual English speaking caller, when the multi-lingual capability may be needed at any moment. When the platform CP1 finds the appropriate CA, the platform routes the call to the next available CA position PO1.

If the parser program has successfully parsed the input, the CA need only press a single "dial" button and the communications platform CP1 automatically dials the forward number. The platform automatically types the CA identification number and a dialing message back to the caller. A typical transaction here reads "CA 1234 DIALING ...". After the call is complete, the relay proceeds in the usual manner with the CA translating between the calling party and the called party.

A parser program stores a lexicon of words which the system expects the caller or other user to employ together with the parts of speech each word or "token" represents. The parsing program also contains a built-in grammar based upon expected use of the word. The parsing program determines whether a given input conforms to that grammar, i.e. whether the input is grammatical. It accomplishes this by matching the cases of the words or tokens of the input to the grammar. Accordingly, the parser program must initially store a grammar suited for the particular expected input text. To accomplish this storage, we establish a context free grammar that describes the type of expected input. Parser programs and their use are known and are described, for example, in "Principles of Compiler Design" by Alfred V. Aho and Jeffrey D. Ullman, published by Addison-Wesely, Reading Mass. copyright 1977 by Bell Laboratories, Inc. An off-the-shelf parsing program is called "yacc" and is part of the tool distribution that accompanies the system called UNIX. Another is called "lex". U.S. Pat. Nos. 5,157,559; 5,146,405; 5,129,013; 5,056,104; 5,020,112; 4,636,939; and 4,446,341 also disclose parsing systems. The aforementioned Aho and Ullman publication, the yacc and lex programs, and the aforementioned patents are hereby made a part of this disclosure as if fully recited herein.

Figure 2:
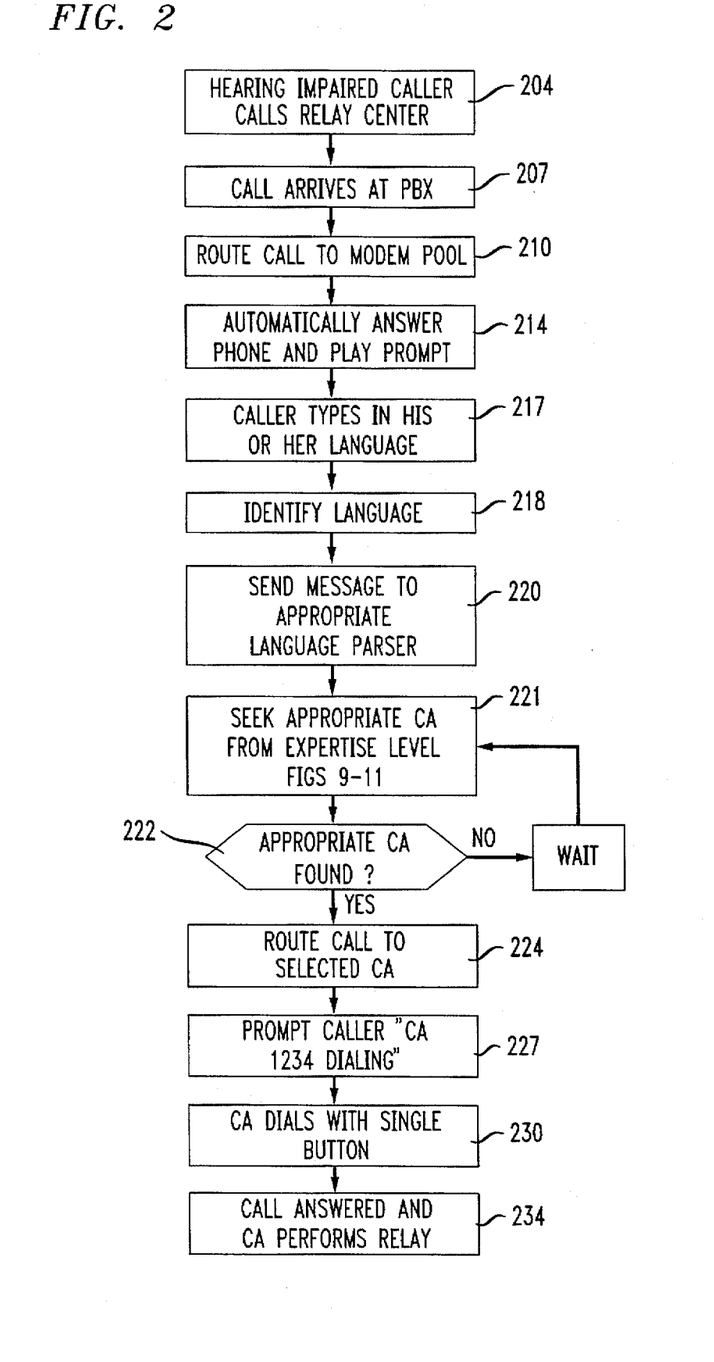
FIG. 2 is a flow chart of steps performed by the structure in FIG. 1 in accordance with an embodiment of the invention.

FIG. 2 illustrates detailed steps performed by the platform CP1 in FIG. 1. There, in step 204, the hearing impaired caller calls the relay center of FIG. 1. In step 207, the call arrives at the PBX. In step 210, the platform CP1 then routes the call to a modem in the modem pool MP1. In step 214, the platform CP1 then automatically answers the phone and plays a prompt such as "TRS here GA". In step 217, the caller then responds by typing a revest such as "PLS CALL 708 713 5260 GA" or "QUEIRO LLAMAR AL 708 713 5260 GA". In step 218 the message goes to the language determination module which identifies the language as English, Spanish, etc. Details of language determination steps appear in FIGS. 6 and 7. In step 220 the platform CP1 sends the message to the particular one of a group of language parsers which parses the language the caller is using. It then uses the appropriate one of the group of language-specific (English, Spanish, etc.) parsers to perform the appropriate determined parsing subroutine or program for analysis.

In this way the platform has determined one of the minimum expertise requirements for the CA, namely the language. Other degrees of expertise, such as typing speed and context recognition also exist. The composition of the CA staff may be such as to permit only selecting CAs on the basis of language expertise. In that case, the platform CP1 is manually set to determine only if a calling attendant CA speaking the language determined in step 218 is available and routes the call to an appropriate language speaking calling attendant CA, if available with billing information automatically supplied by the parsing program. Details of the determination and selection of only the appropriate language-speaking CA appears in FIGS. 9 to 12. The platform CP1 then returns to step 224.

If the composition of the CA staff is such as to permit or require selection of CAs on the basis of other or additional expertise, the platform CP1 is set to a default condition. There the platform CP1 seeks a CA having an expertise level appropriate to the call, namely a level meeting as much of the expertise required as possible with as little excess as possible. Thus in step 222 the platform CP1 looks for the required expertise level as shown in FIGS. 9 to 12. In step 222 it asks if the appropriate CA has been found. If no CA has been found in step 222, the platform plays an announcement in the caller's language and goes to step 223 to wait until any CA has become free. As soon a CA becomes free it returns to 222. If a CA has been found in step 222 then the platform routes the call to that CA in step 224. Then, in step 227, the platform CP1, through the analog lines AL1, prompts the caller with a message in the appropriate language. In English a message would be "CA 1234 DIALING . . . ". In step 230, the CA dials with a single button. In step 234, the call is answered and the CA performs the usual relay translation.

Figure 3:
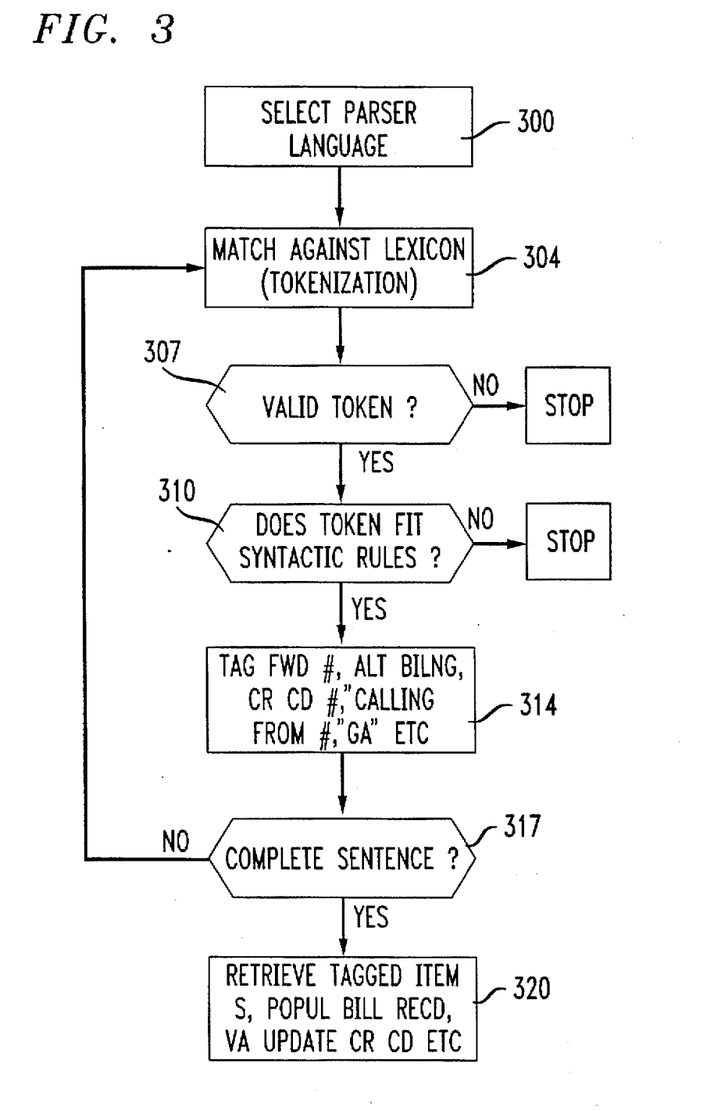
FIG. 3 is a flow diagram of steps performed by the system of FIG. 1 for parsing messages from a caller and embodying the invention.

Details of the parsing operation of step 220 appear in FIG. 3. Details of step 218 for identifying the language being used appear in FIGS. 6 and 7.

Figure 6:
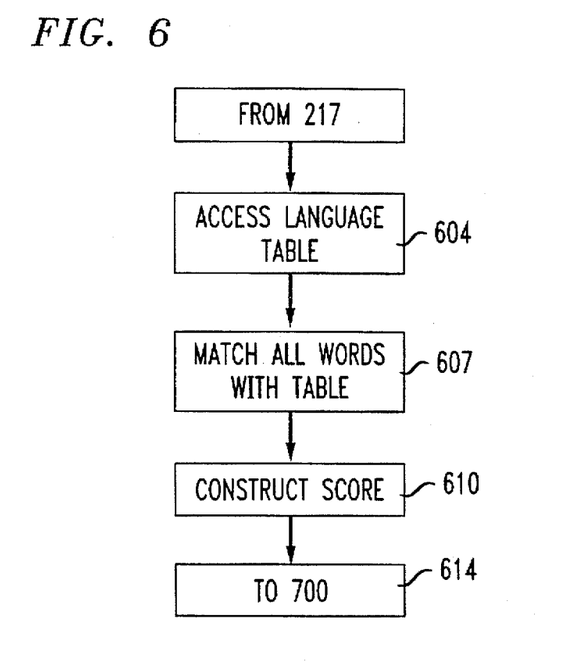
FIGS. 6 and 7 are flow charts showing details of steps performed in FIG. 2 and embodying the invention.
Figure 7:
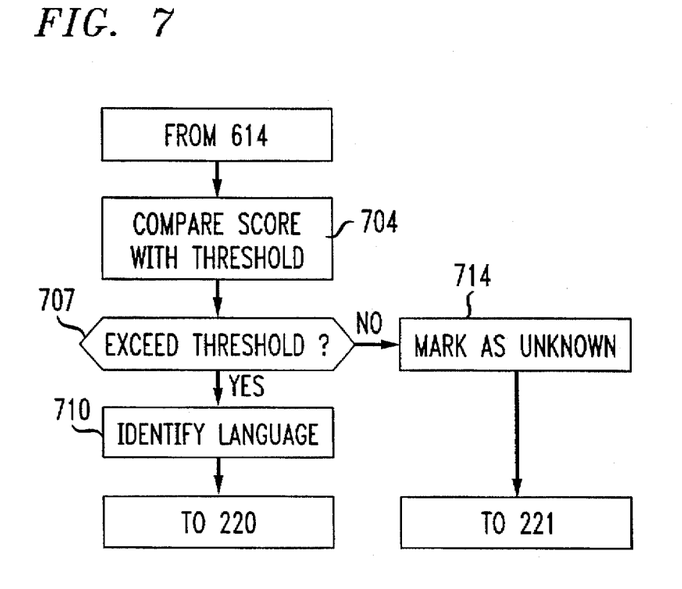

As shown in FIG. 6, the platform CP1 determines the language being used (step 218) by accessing data from a previously constructed language table TA1 (in the platform CP1) of all expected keywords from each language being supported. This occurs in step 604.

For example for English and Spanish the table TA1 includes at least the following words:

| English | Spanish |
| --- | --- |
| Number | Numero |
| I | Yo |
| My | Mi |
| Our | Nuestro |
| Phone | Telefono |
| Please | Por Favor |
| Call | Llamar |

In step 607, the platform CP1 matches every input word from the caller against all the words in the language table. In step 610 the platform CP1 constructs a score in the form a probability table. For example 90% likely to be English, 40% likely to be Spanish etc. In step 614, it goes to step 704 in FIG. 7. In step 704 compares the score with a threshold such as 85%. In step 707 it asks if any language score exceeds the threshold. If yes, i.e. a score exceeds the threshold, the platform CP1 identifies the language in step 710 and proceeds to step 220 in FIG. 2. If no, or if more than one language exceeds the threshold, the platform CP1 marks the language as unknown in step 714, and proceeds to step 222.

Scoring allows for misspelled words. In one embodiment of the invention, a word is counted as matching a word in the table if it differs by no more than 3 "differences", e.g. insertions, deletions, or changes of a letter. However points are deducted from the score for each difference. The spellings are corrected where possible for parsing.

The platform CP1 contains a parser program for each language it supports. To construct the parser program in any language requires creating a corpus of sample input text based upon expected transactions with customers. Such program creation involves avoiding actual names and phone numbers. For example, expected transactions in the English language, such as "PLS CALL DAVE AT (708) 713-5260 OK GA" are rendered as "PLS CALL PNAME AT (XOX) XXX-XXXX OK GA" to permit the use of any name and number. The corpus is analyzed to create a context free grammar. The parser subroutine, such as disclosed in the aforementioned Aho and Ullman book and the previously mentioned patents, operates on this context free grammar that accounts for most of the corpus. The parser subroutine parses the context free grammar and is in the form of standard compiler tools, such as lex or yacc. A typical rule in the grammar is:

S→CALL_VERB TO_NUMBER GA
TO_NUMBER→AREA_CODE-NXX-XXXX

Another embodiment of the invention uses a finite state grammar instead of a context free grammar to describe this subset of English or any other language. However, a context free grammar is intrinsically more powerful or at least more easily constructed.

The parser subroutine in the English language takes the form of lex, yacc, or other C codes and takes as input a buffer of text and produces as output a "success" or "failure" indication. In the case of success, it populates a billing record with all the information it extracted. The grammar looks for forward and back numbers, although back numbers hardly ever occur. It looks for key words such as "collect", "person-to-person", "credit card", etc. It looks for credit card numbers. The formats of all credit cards normally accepted are known. A valid credit card number always permits determination of the issuer, e.g. Visa, Amex, Diners, etc. of card. Phone numbers which exist have seven digits, ten digits, (seven plus area code), eleven digits (seven plus area code plus 1) or multi-digit international numbers which start with 011. The parser subroutine accepts all methods of presentation such as combinations of spaces, dashes, parentheses, etc. The grammar is easily updated to cover cases that have been missed or to add new applications.

FIG. 3 illustrates the steps of the parsing process in step 220 of FIG. 2. Here, in step 300, the platform CP1 first selects the parser for the identified language. In step 304 the selected parser matches the input against the stored lexicon. This is called "tokenization". In step 307 it determines whether the token or word is valid, i.e. in the lexicon. If not, the parsing stops and the program routes the call to the CA. If valid, in step 310, it asks whether the token fits into the syntactic rules of the grammar. If not, the parsing stops and the call is routed to the CA; if it fits, the program goes to step 314. Here, the subroutine looks for and tags a forward number. The number may be seven, ten, or eleven digits, or may be international. All valid combinations are accepted such as 555-1212, 555 1212, 1 708 5551212, 1 (708) 555 1212, etc. In step 314, the parser subroutine also looks for and tags an alternate billing number and looks for and tags a credit card, collect, person-to-person, and third number. The parser subroutine in step 314 also looks for and tags a "calling from" number which is usually supplied by the PBX, and looks for a terminator such as "GA".

In step 314, when the parser subroutine looks for the "calling from" number which originated the call, the latter is usually supplied automatically by the PBX. In step 317, the parser subroutine determines if this is a complete sentence as decided by the grammar. If not it returns to step 304 for the next entry. If it is a complete sentence, it goes to step 320 and retrieves all tagged items. It then populates a billing record with the forward number, the billing method, the credit card number, and calling number if present. The process then continues with step 221 which selects the language appropriate CA. If the parsing is unsuccessful, step 221 also selects the language appropriate CA.

Details of step 221 for finding and routing to a language appropriate CA appear in FIG. 9 to 12. In step 222, the platform CP1 asks if the appropriate CA has been found. If no, the process returns to step 221. If yes, the platform CP1 routes the call to the appropriate CA in step 224. The process now goes to step 227.

Figure 4:
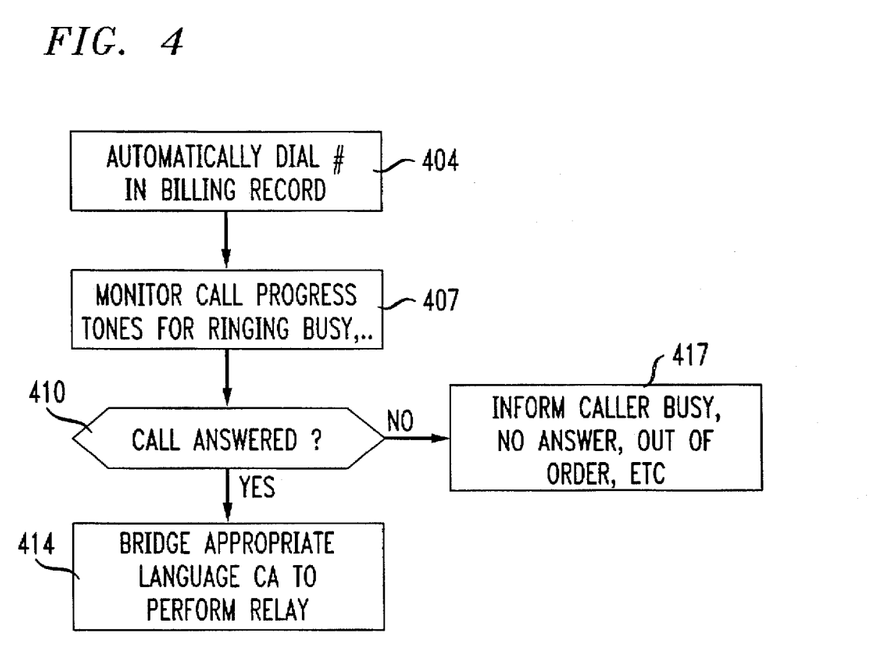
FIG. 4 shows steps performed in the structure of FIG. 1 and embodying the invention for automation of voice originated relay calls.

According to another embodiment of invention, the platform CP1 automatically places the call by dialling the forward number after step 220. Then, instead of continuing with steps 221 to 234 of FIG. 2, the platform CP1 proceeds as shown in FIG. 4. In step 404, the platform CP1 automatically dials the number in the billing record. Thereafter, in step 407, the platform CP1 monitors the call progress tones automatically for ringing, busy, reorder, etc.

In step 410, the platform CP1 then asks whether the call has been answered. If yes, the call proceeds to step 414 and the platform CP1 bridges a CA at one of the positions PO1 onto the call to perform the relay in accordance with FIGS. 9 to 12. If the answer is no, that is, the line is busy, out of order, or gives no answer, the platform CP1 in step 417 informs the caller automatically and no CA is needed unless requested. Because a large number of calls are either busy or give no answer, the use of the steps in FIG. 4 reduces the overall work time by avoiding use of the CA's for calls that cannot be completed.

In FIG. 4, when the operation is successful, the system automatically dials the forward number and places a "call progress tone detector" on the line. In the case of a busy, the platform automatically informs the caller that the line is busy. This is also so, in the case of no answer. In the case of an answer, the platform CP1 recognizes the answer and method of answer, e.g. voice or Baudot or ASCII. Baudot is a communication protocol used by TDD's and constitutes a series of tones with no carrier. ASCII is a modem to modem communication protocol. In the case of a baudot or ASCII answer, the platform CP1 plays a greeting to the forward party and then connects a communication assistant to the line. In the case of voice answer, the platform will connect a CA to the line immediately.

The system according to the invention is completely invisible to subscribers as long as the parsing works correctly. The arrangement requires no explicit cooperation or concession on the part of subscribers. If the system is loaded to the point that there are no CA's available but there are available modems, the connection will take place, but after the caller types "GA" a delay occurs in getting an operator. If this delay exceeds a certain threshold, the platform CP1 plays a "please hold" message.

Figure 5:
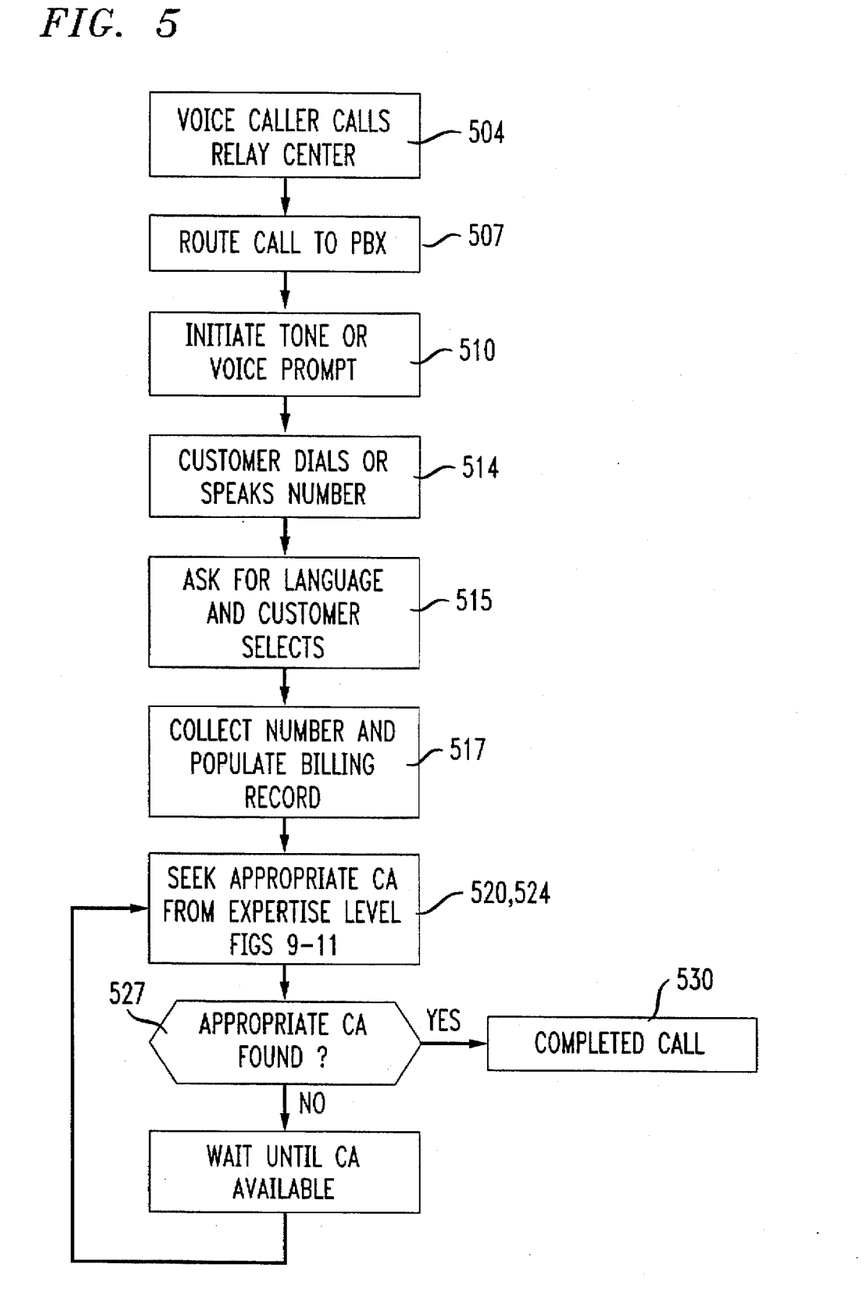
FIG. 5 is a flow diagram of steps performed by the structure of FIG. 1 and embodying the invention for automation of a forward call.

FIG. 5 illustrates the steps when a voice caller calls the relay center. Here, in step 504, the caller calls the relay center. Thereafter, in step 507, the call is routed to the PBX. Then, in step 510, the PBX routes the call to the platform CP1 which answers the call and plays a prompt. The latter may be a dial tone or a voice prompt.

Then, in step 514, the customer dials or speaks the number. In step 515 the customer is asked if he or she wants to communicate in a language other than the default language, e.g. English, and he or she identifies such a language, e.g. by pressing a DTMF (dual-tone multiple-frequency) key, or saying the name of the language for detection by a speech recognition system. Thereafter, the platform CP1 collects the number and populates the billing record in step 517. Then, in step 520, the platform CP1, using the steps in FIGS. 9 to 12, selects the required expertise level. In step 524, using the steps of FIGS. 9 to 12, it seeks the appropriate CA. In step 527 it checks to see if appropriate CA has been found. If no, it waits for a short period and returns to step 524. If yes, the platform CP1 goes to step 130 and completes the call by assigning the CA.

Figure 8:
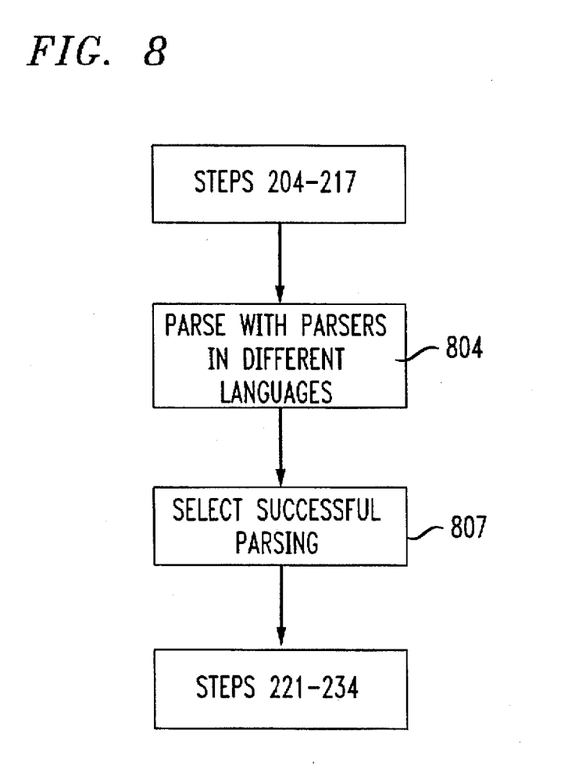
FIG. 8 is a variation of FIG. 2 and shows details of steps embodying the invention.

Another embodiment of the invention appears in FIG. 8. This is a variation of FIG. 2 in which all the steps of FIG. 2 but steps 218 and 220 are the same. Here, in step 804 (instead of steps 218 and 220) the platform CP1 sends the message to a group of different language parsers which parse the message in different languages. In step 807, the platform CP1 identifies the language by selecting the one of the group of language-specific (English, Spanish, etc.) parsers which succeeds in performing the parsing subroutine or program. Thereafter, the platform CP1 proceeds with steps 221 to 234 in FIG. 2.

Figure 9:
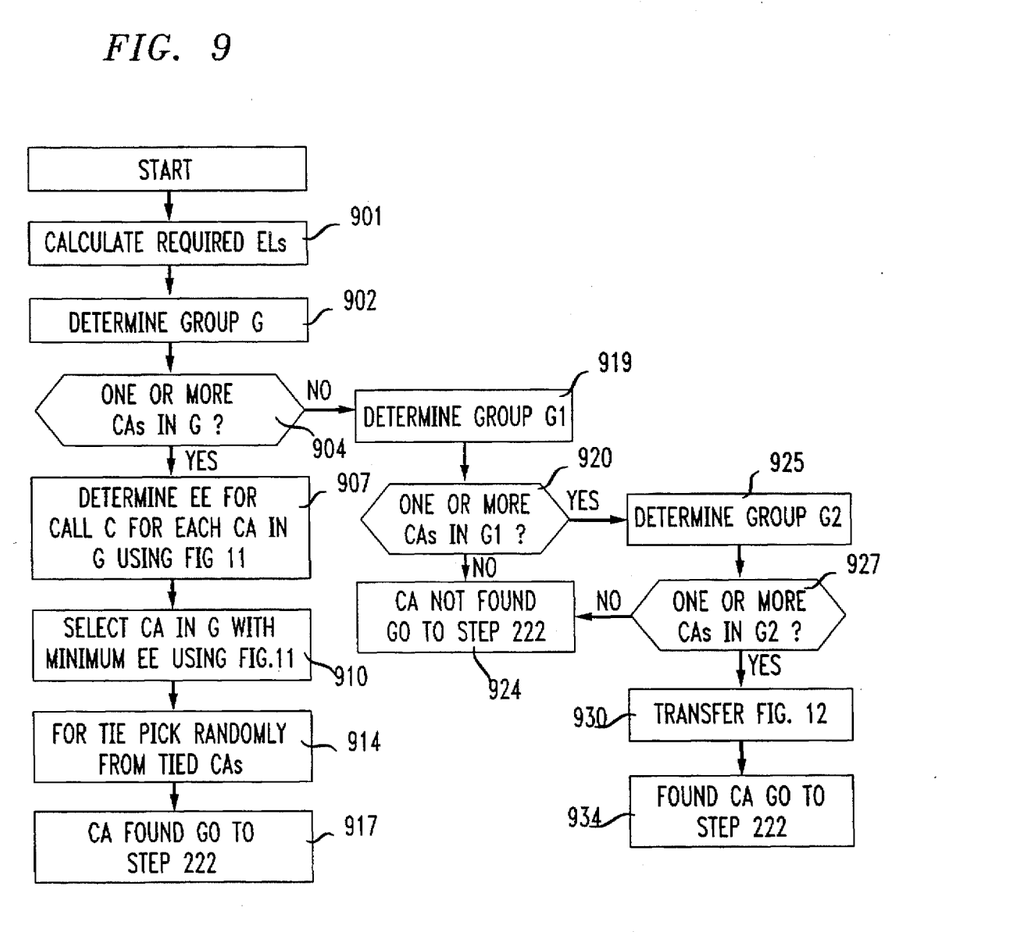
FIG. 9 is a flow chart showing details of a step in FIG. 2.

In FIG. 9, the platform CP1 finds the appropriate CA. Here, the incoming call is "call C", the expertise level is "EL", and "EE" is the excess expertise as defined in FIGS. 10 and 11.

Figure 10:
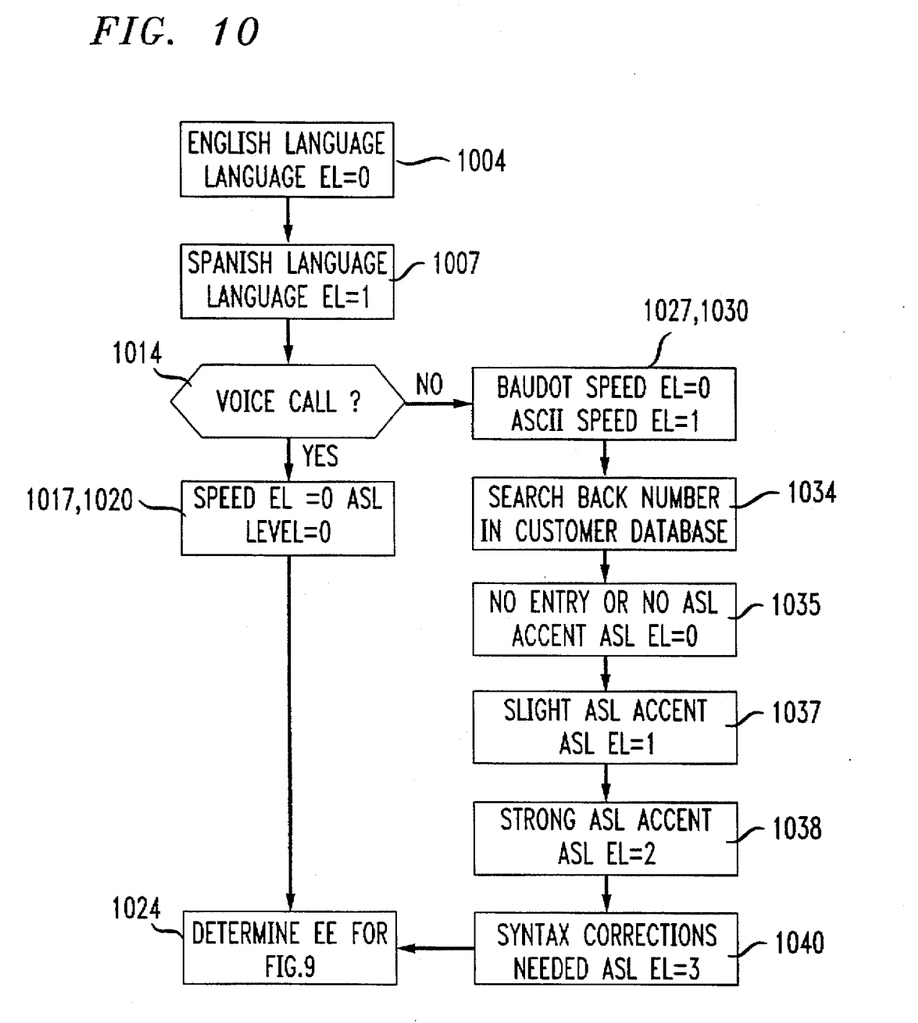
FIG. 10 is a flow chart showing details of a step in FIG. 9.
Figure 11:
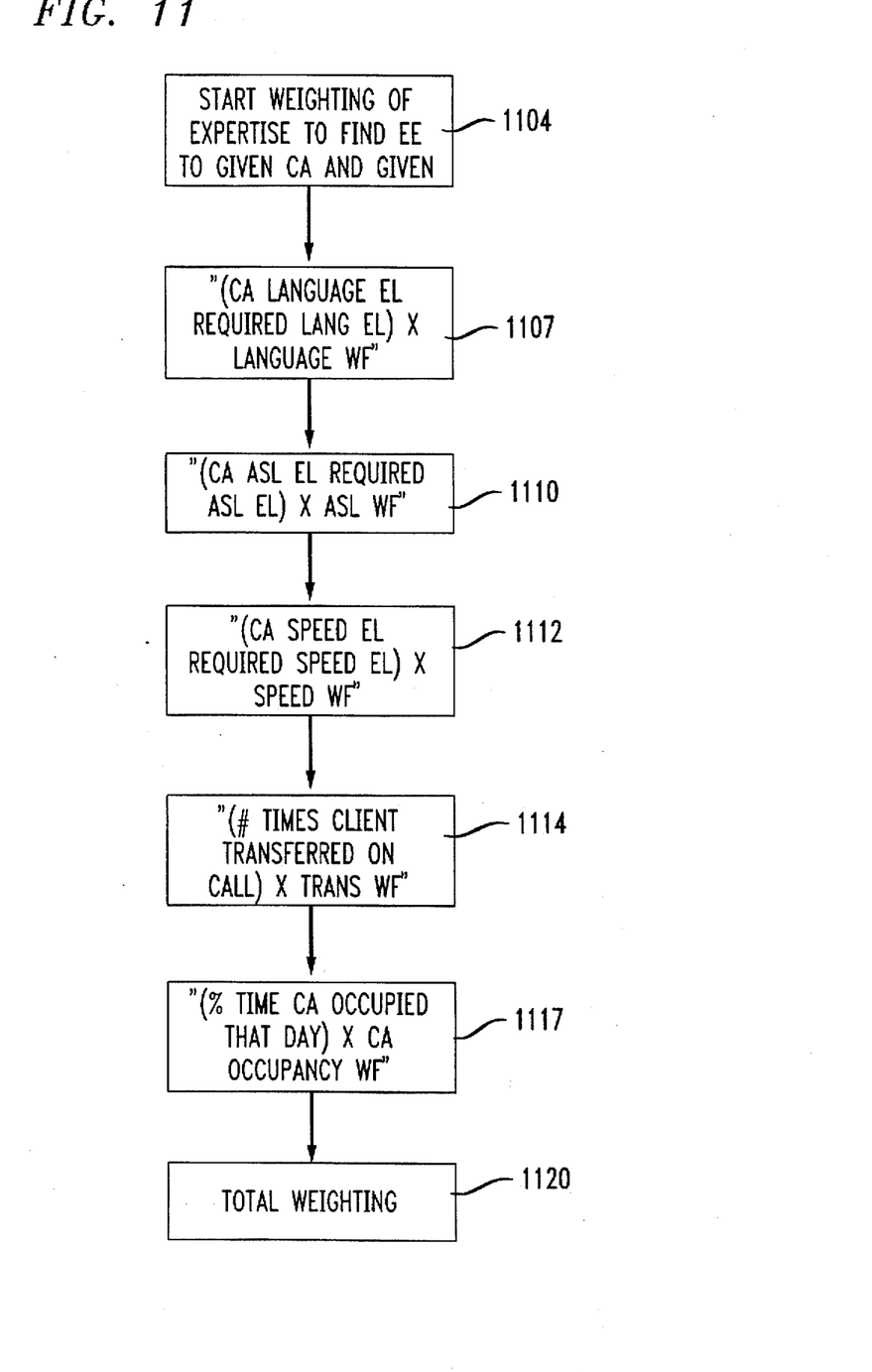
FIG. 11 is a flow chart showing details of a step in FIG. 10.

The operation in FIGS. 9 to 11 involves a definition of "Excess Expertise" (EE). EE includes expertise levels (EL's) defined for language, typing speed, and ASL capability. There are also two other factors that are not actually expertise, but which are added to avoid excessive transferring of callers, and to balance the CA workload.

The overall strategy is as follows. For an incoming call, there are potentially three groups of CA's. Group G is qualified for the task and free. Group G1 is qualified for the task, but busy with other tasks. Group G2 is qualified to do one or more of the tasks occupying CA's in G1.

In step 901 of FIG. 9, the platform CP1 uses the steps in FIG. 10 to determine the EL's required for the call. In step 902 the platform CP1 determines the group G of CA's whose expertise levels, recorded in DB2 of FIG. 1, equal or exceed all the EL's required for the call. In step 904 the platform CP1 asks if there are one or more CA's in group G. If yes, the platform CP1 in step 907 calculates the EE, i.e. expertise excess, for call C for each CA in the group G as shown in FIG. 11. In step 910, the platform CP1 selects the CA in group G with the minimum excess expertise (EE) using the calculation of EE detailed in FIG. 11. In step 914, if there is a tie, the platform CP1 picks randomly from the tied CAs. In step 917, it then indicates that the CA has been found and returns the answer to step 222 of FIG. 2.

If the answer in step 904 is no, the platform CP1 determines in step 919 if a group G1 of CAs exist, each of whom has at least the required ELs for call C, and has one or more ELs that are greater than what is required for the calls this CA is currently busy with. In step 920, the platform CP1 asks if there is one or more CAs in group G1.

If no, the platform CP1 goes to step 924 and there exits with the information to step 222 that no CA has been found. If yes, the platform CP1 in step 925 determines a group G2 of one or more CAs, all of whom are not in group G1, are currently free, and have the required ELs for one or more of the tasks currently occupying the CA in group G1. In step 927 the platform CP1 asks if there are CAs in group G2. If no, the platform goes to step 924. If yes, in step 930 the platform CP1 applies a transfer as set forth in FIG. 12 to transfer a task from a CA1 in group G1 to a CA2 in group G2 and assign call C to the CA1 in G1. In step 934, it signals to step 222 in FIG. 2 that a CA has been found.

FIG. 10 illustrates the manner in which the platform CP1 determines the expertise level required for the call. In step 1004, it checks to see if only English is needed, in which case it assigns language EL=0. In step 1007 it checks to see if Spanish is needed, in which case language EL=1.

In step 1014, it determines whether this is a voice call. If yes, it assigns the default values of 0 to speed EL in step 1017 and ASL EL in step 1020. In step 1024 it then returns to step 902 in FIG. 9.

If the answer in step 1014 is no, in step 1027, the platform CP1 assigns a speed EL of 0 for Baudot transmission, and in step 1030 a speed EL of one for ASCII transmission. In step 1034, it searches the back number in the customer data base DB1 to determine the requirements of the customer. In step 1035 if there is no entry or no ASL "accent", the platform CP1 assigns an ASL EL of zero. If the back number indicates a slight ASL accent, the platform CP1 assigns an ASL EL of 1 in step 1037. If the back number indicates a strong ASL accent the platform CP1 assigns an ASL EL of 2 in step 1038. If the back number indicates syntax corrections are needed, the platform CP1 assigns an ASL EL of 3 in step 1040. These levels are applied to determine the EE for FIG. 9 in step 1024.

FIG. 11 illustrates the manner in which the platform CP1 finds the Excess Expertise for a particular CA for a particular call C. Whenever the platform CP1 reaches this point, the required EL's for the call have been determined in by the steps in FIG. 10. These required EL's will be called "REL" in the description of this figure Each CA has an expertise level for each dimension in the CA data base DB2.

There are also a number of weighting factors (WF) in the weighting factor data base DB3 of FIG. 1. These include a language WF, e.g. 2.0, a speed WF, e. g. 1.0, and ASL WF, e. g. 2.1, a client transfer, eg. 3.0, and a CA occupancy WF, e.g. 0.3.

In step 1107 calculates the CA's language EL (LEL) minus the required language EL (REL), together multiplied by the language weighting factor (LWF), i.e. (LEL–REL) LWF. In step 1110, the platform CP1 adds the CAs ASL EL (AEL) less the required ASL EL (RAL), together multiplied by the ASL WF (AWF), i.e. (AEL–RAL)AWF. In step 1112, the platform CP1 adds (the CA Speed EL–Required Speed EL)×speed WF. In step 1114, the platform CP1 adds the number of times the client has been transferred on the current call multiplied the client transfer WF. In step 1117, the platform CP1 adds the percentage of time the CA has been occupied that date multiplied by the CA occupancy WF. These additions result in total weighting, step 1120, to produce the excess expertise of the CAs for that call.

Figure 12:
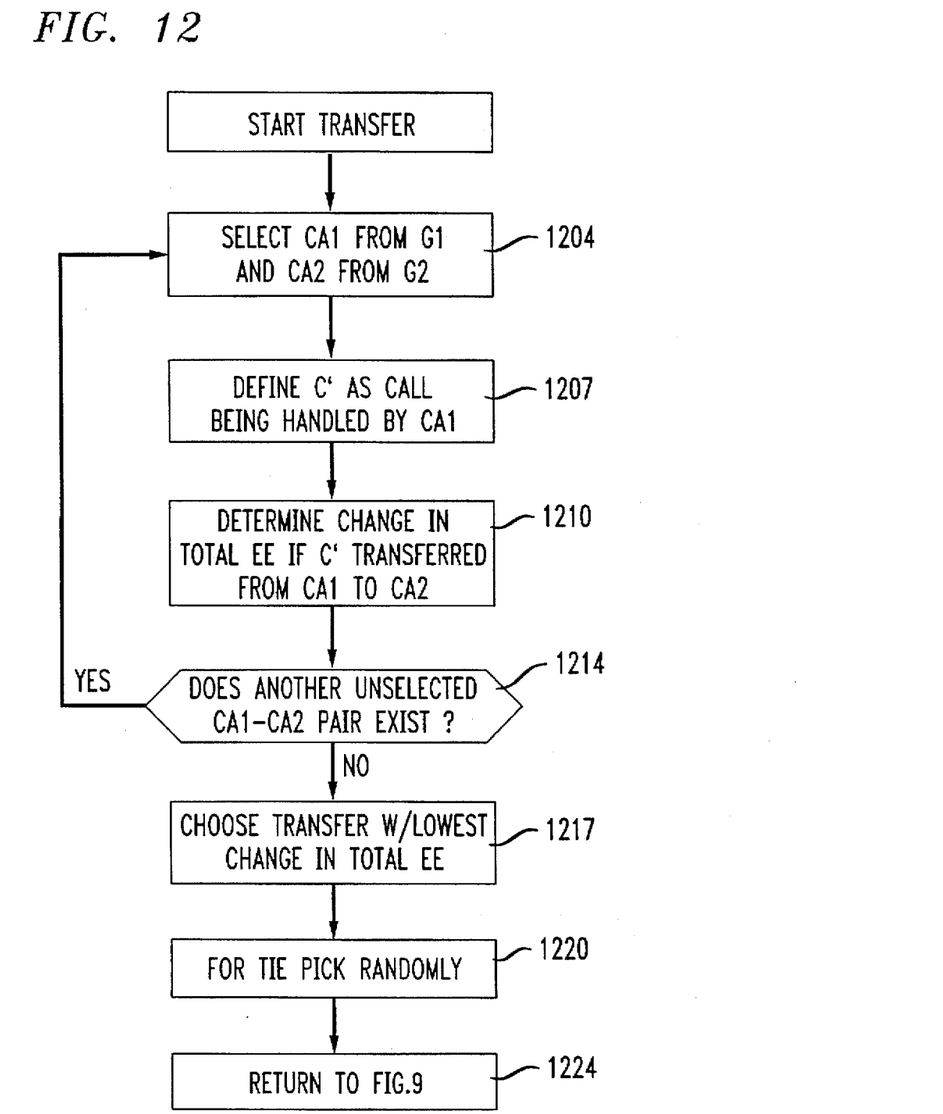
FIG. 12 is a flow chart showing details of a step in FIG. 11.

FIG. 12 illustrates the manner in which the platform CP1 transfers calls between CAs. At this point in the procedure, the platform CP1 is attempting to find a CA for an incoming call C. In step 1204, platform CP1 selects a CA CA1 in group G1 and a CA CA2 in group G2 for an incoming call C from FIG. 9. In step 1207 the platform CP1 defines C' as the call being handled by CA CA1. In step 1210, the platform CP1 determines and memorizes the change in the total EE that would take place if C' were transferred from CA1 to CA2. That is, it determines the EE for CA2 doing C', minus EE for CA1 doing C', plus EE for CA1 doing C.

In step 1214 the platform CP1 asks whether another unselected pair CA1–CA2 exist. If yes, it goes back to step 1204 to select another CA1–CA2 pair and passes again through steps 1207 and 1210. If the answer in step 1214 is no, because all pairs have been exhausted, in step 1217 the platform CP1 chooses the transfer from CA1 to CA2 with the lowest change in total EE. In step 1220 it determines if there is a tie and picks randomly. In step 1224 it responds to step 1217 and 1220 and returns to FIG. 9.

The invention is part of an upfront automation process. It adds another dimension to the CA selection process to enhance the efficiency of calls of this type. The platform CP1 can respond to a free-form or "free-style" input from a caller, without having the caller respond to a repetitive menu, in one of a number of languages and automatically complete the call and select an appropriate CA to the caller.

While embodiments of the invention have been described in detail, it will be evident to those skilled in the art that the invention may be embodied otherwise without departing from its spirit and scope.

For example, according to another aspect of the invention, the platform PC1 allows customers to create a "profile". The profile is just a file of preferences. As a part of the profile, the customer adds a speed dial list, e.g. a list of the form

| mom | 555-1234 |
| work | 555-2222 |
| lawyer | 555-4444 |
| etc. | |

As soon as a call comes in, the platform CP1 looks for a profile associated with the back number. When the caller calls in, the system looks up the caller's profile. Then, in the upfront automation parsing steps, in addition to looking for phone numbers, will also look for elements of the caller's speed-dial list. So if a callers sends "pls call mom ga", the platform CP1 will find "mom" in the caller's speed dial list of the callers profile, and the platform CP1 will automatically fill in "mom's" number into the forward number. Similarly, the caller can say "Please call my lawyer ga", etc.

What is claimed is:

1. A method of relaying a call between a telephone device for the deaf (TDD) and other users, comprising:
   automatically notifying a TDD caller of readiness to receive input;
   automatically analyzing received calling information in an expertise-identifying parsing routine;
   selecting a communication assistant capable of expertise identified in the analyzing step; and
   automatically routing the call to the selected communication assistant;
   wherein the expertise is identified on the basis of syntax corrections required.

2. A method of relaying a call between a telephone device for the deaf (TDD) and other users, comprising:
   automatically notifying a TDD caller of readiness to receive input;
   automatically analyzing received calling information in an expertise-identifying parsing routine;
   selecting a communication assistant capable of expertise identified in the analyzing step; and
   automatically routing the call to the selected communication assistant;
   wherein the expertise is identified on the basis of American Sign Language ASL syntactic "accent".

3. A method of relaying a call between a telephone device for the deaf (TDD) and other users, comprising:
   automatically notifying a TDD caller of readiness receive input;
   automatically analyzing received calling information in an expertise-identifying parsing routine;
   selecting a communication assistant capable of expertise identified iD the analyzing step; and
   automatically routing the call to the selected communication assistant;
   wherein the expertise is identified on the basis of speed of callers communication.

4. The method as in claim 3, wherein the expertise is identified on the basis of syntax correction, ASL syntactic accent, and language.

5. The method as in claim 3, wherein the expertise is identified on the basis of speed of callers typing.

6. The method as in claim 3, wherein the expertise is identified on the basis of speed of callers communication of language.

* * * * *